INVENTORS
MARK VAN BUSKIRK
LARRY I. BLAND
BY
ATTORNEY

United States Patent Office 3,439,232
Patented Apr. 15, 1969

3,439,232
CAPACITOR TERMINAL CONNECTION
Mark Van Buskirk and Larry I. Bland, Indianapolis, Ind., assignors to P. R. Mallory & Co., Inc., Indianapolis, Ind., a corporation of Delaware
Filed Nov. 30, 1966, Ser. No. 597,981
Int. Cl. H01g 9/04
U.S. Cl. 317—230                                7 Claims

ABSTRACT OF THE DISCLOSURE

A bushing is positioned in an aperture formed in the end closure of a capacitor, the closure having a sandwich construction of plastic and rubber. This permits an efficient electrical-mechanical fit between a rivet extending through the aperture so as to electrically connect an electrical terminal to an internal lead of the capacitor.

---

Figure 1:
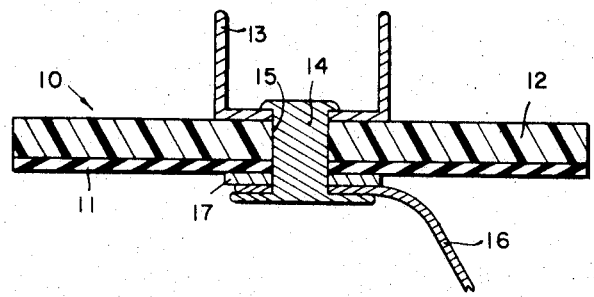

Electrolytic capacitors commonly use rubber-faced plastic discs as the end closures for the capacitor. Such material serves as a good electrical insulator for the electrical leads running from the capacitor. Electrical contact between an internal lead of the capacitor and an outside terminal is normally made through a rivet connection, the rivet extending through an aperture in the closing. This arrangement causes difficulty in securing a tight, secure fit between the rivet and the rubber-faced plastic closure. Such difficulty causes the electrical path between the terminal and the electrical leads to be broken down, thereby increasing the electrical resistance of the system.

The present invention is concerned with the provision of a novel means to secure an electrical-mechanical connection for electrical leads to a rubber-faced plastic capacitor end closure and has as one of its objects the provision of such a connecting means that has a more reliable connection.

Another object of the invention is to provide a good electrical connection between an electrical terminal and an internal lead of an electrolytic capacitor having a rubber-faced end closure.

Another object of the invention is to provide a good electrical-mechanical connection between an electrical terminal and an internal lead of a capacitor utilizing a rubber-faced end closure through a rivet or pin type connection.

Still another object of the invention is to provide such a connection wherein a bushing is used to insure that there will be a good electrical path between the electric terminal and the internal lead of the capacitor.

With the above and other objects in view, which will appear as the description proceeds, this invention resides in a novel electrical-mechanical connecting assembly for electrolytic capacitors utilizing rubber-faced end closures substantially as described herein and more particularly defined by the appended claims, it being understood that such changes in the precise embodiment here disclosed may be made as come within the scope of the claims.

Figure 2:
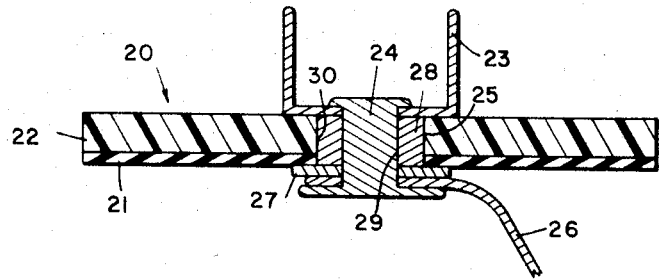

In the drawings:

FIGURE 1 is a cross section of a typical prior art terminal connection for electrolytic capacitors; and FIGURE 2 is a cross section of a terminal connection for electrolytic capacitors made according to the present invention.

Generally speaking, a terminal connection for an electrolytic capacitor is provided which comprises a rivet extending through an aperture formed in a rubber-faced plastic disc which serves as the capacitor's end closure, a bushing tightly held in the aperture and having a bore through which the rivet extends, an electrical terminal fixedly held to the outer surface of the closure by the rivet, a washer surrounding the rivet and being disposed at the inner surface of the closure, and an integral electrical capacitor lead being held by the rivet against the washer.

Referring now to FIGURE 1, a typical prior art electrolytic capacitor employs an end closure consisting of a disc 10 having a rubber face 11 and a plastic base 12 to seal the capacitor body and to provide for a means for connecting suitable electrical terminals to the capacitor. An electric terminal 13 is attached to the disc 10 through a rivet 14 or similar type of pin connection which extends through an aperture 15 in the closure. The rivet also serves as an electrical connection between the terminal 13 and an internal lead 16 of the capacitor, the internal lead being held against a washer 17 by the rivet.

With this type of construction it is very difficult to achieve a good mechanical connection due to the inability to achieve a snug fit in the aperture of the rubber-faced plastic closure 10. Such a fit is needed in order to insure that the electrical path from the internal lead 16 to the terminal 13 will be unbroken. With the prior art arrangement, the connection tends to have a high electrical resistance because of the poor contact between the terminal 13 and the rivet 14. This has been overcome by the arrangement of the present invention which is shown in FIGURE 2.

Referring to FIGURE 2, the closure for the capacitor again consists of a disc 20 constructed of a plastic base 22 having a rubber face 21. The disc has an aperture 25 into which a bushing 28 is snugly fitted, the bushing having a bore 29 through which rivet 24 is extended. The diameter of the bore 29 and the diameter of the inner surface 30 of the aperture 25 are such that the bushing and the rivet are tightly fitted into the disc and the bushing.

Rivet 24 serves to connect electric terminal 23 to the disc 20 and also serves as an electrical connection between the terminal and an internal lead 26 of the capacitor, the lead being held against a washer 27 by the rivet. As an alternative, the washer and the bushing could be a solid single piece.

With this arrangement there will always be a metal to metal contact between the terminal 23 and the internal lead 26 through the bushing 28 and washer 27. Thus there will always be a good electrical path for the electrical connection in addition to the rivet, thus yielding a lower resistance connection.

From the foregoing description taken in conjunction with the drawings it will be apparent to those skilled in the art that this invention provides a new and improved terminal connecting means for electrolytic capacitors. Accordingly, it is contemplated that the scope of the invention is to be determined from the claims appended hereto.

What is claimed is:

1. A terminal connection for an electrolytic capacitor having an open ended container and an insulative disc closing said open end, said connection comprising a rivet extending through an aperture in said disc, a bushing tightly held in said aperture and having a bore, said rivet extending through said bore, an electrical terminal fixedly held to the outer surface of said closure by said rivet, a washer surrounding the rivet and being disposed against the inner end of said bushing and the inner surface of said disc, and an internal electrical capacitor lead under the head of and held by said rivet against said washer.

2. A terminal connection for an electrolytic capacitor according to claim 1 in which said bushing and said washer are formed from a single solid piece.

3. The terminal connection of claim 2, wherein said washer surrounds the shank of said rivet.

4. The terminal connection of claim 3, wherein said washer engages with said shank of said rivet.

5. The terminal connection of claim 4, wherein said bore of said bushing engages with said shank of said rivet.

6. The terminal connection of claim 2, wherein said bushing and said washer are electrically conductive.

7. The terminal connection of claim 2, wherein said electrical terminal has a substantially U-shaped cross-section.

References Cited
UNITED STATES PATENTS

| | | | |
|---|---|---|---|
| 2,225,801 | 12/1940 | Schnall | 317—230 |
| 2,847,622 | 8/1958 | Bugel | 317—230 |
| 2,862,156 | 11/1958 | Ruben | 317—230 |

JAMES D. KALLAM, *Primary Examiner.*

U.S Cl. X.R.

174—52